(12) United States Patent
Hazlewood

(10) Patent No.: US 7,469,968 B2
(45) Date of Patent: Dec. 30, 2008

(54) SELF-REGULATING SIDE FACING CLOSEOUT FOR SEAT BACK

(75) Inventor: Robert Joseph Hazlewood, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 148 days.

(21) Appl. No.: 11/337,415

(22) Filed: Jan. 23, 2006

(65) Prior Publication Data
US 2007/0170755 A1  Jul. 26, 2007

(51) Int. Cl.
*A47C 7/24* (2006.01)

(52) U.S. Cl. .............................. 297/452.58; 297/452.59; 297/452.62

(58) Field of Classification Search .............. 297/219.1, 297/112, 182, 218.1, 218.2, 218.3, 218.5, 297/224, 225, 228.1, 228.11, 228.13, 230.11, 297/230.12, 248, 249, 257, 452.16, 452.58, 297/452.59, 452.62
See application file for complete search history.

(56) References Cited

U.S. PATENT DOCUMENTS 1,761,657 A * 6/1930 Connor et al. ......... 297/228.11
1,955,040 A * 4/1934 Wittcoff ................... 297/219.1
3,804,457 A * 4/1974 Hellman ................... 297/219.1
4,686,130 A * 8/1987 Kon ............................. 428/71
4,958,886 A * 9/1990 Barattini et al. ............. 297/229
6,623,061 B2* 9/2003 Tourangeau et al. .......... 296/63
2005/0179306 A1* 8/2005 White et al. ........... 297/452.33

FOREIGN PATENT DOCUMENTS

JP      02-193606        7/1990
JP      2003-118457     4/2003

* cited by examiner

*Primary Examiner*—David Dunn
*Assistant Examiner*—Patrick D Lynch
(74) *Attorney, Agent, or Firm*—Gifford, Krass, Sprinkle, Anderson & Citkowski, P.C.

(57) ABSTRACT

A seat assembly for a vehicle includes a first seat back and a second seat back. The seat backs are spaced apart to define a gap therebetween. Each seat back is pivotally coupled in the vehicle for independent angular adjustment relative to each other. Each of the first and second seat backs has a trim cover. The trim cover of at least one of the seat backs has a flap that conceals the gap between the seat backs. The flap is flexible to accommodate the independent angular adjustment of the seat backs relative to each other.

9 Claims, 3 Drawing Sheets

SELF-REGULATING SIDE FACING CLOSEOUT FOR SEAT BACK

BACKGROUND OF THE INVENTION

1. Field of the Invention

The invention relates to seat assemblies for vehicles. More specifically, the invention relates to a trim cover utilizing a stretchable material that conceals a gap and flexes to allow articulation of the seat.

2. Description of the Related Art

A vehicle seat assembly typically includes a cushion and a back. The back is usually pivotally adjustable relative to the cushion between a plurality of reclined seating positions. The seat back includes a rigid frame and a foam pad positioned on a front surface of the frame. A leather, vinyl or textile trim cover typically covers both the frame and the pad to provide a pleasing outer appearance and a seating surface for an occupant of the seat assembly.

Some vehicles include rear seat assemblies having split seat backs, for example in a "40/60" or "50/50" split. Split seat backs are also typically adjustable relative to the seat cushion between a plurality of reclined seating positions. The split seat backs are independently adjustable relative to each other, thus making it possible for a gap to be created between the split seat backs when adjusted at different angles.

It remains desirable to provide an effective, low cost means of concealing the gap between the split seat backs, while accomodating the independent angular adjustment of the seat backs relative to each other.

SUMMARY OF THE INVENTION

According to one aspect of the invention, a trim cover is provided for covering a seat back assembly of an automotive vehicle. The trim cover includes a center panel, a pair of side panels, a flap and an elastic member. The center panel has spaced apart ends. The pair of side panels is fixedly secured to respective ends of the center panel. The flap is fixedly secured to one of the side panels. The elastic member continuously biases the flap to an outwardly extending position for concealing a gap between the seat back assembly and an adjacent structure in the vehicle during selective pivotal adjustment of the seat back relative to the vehicle.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
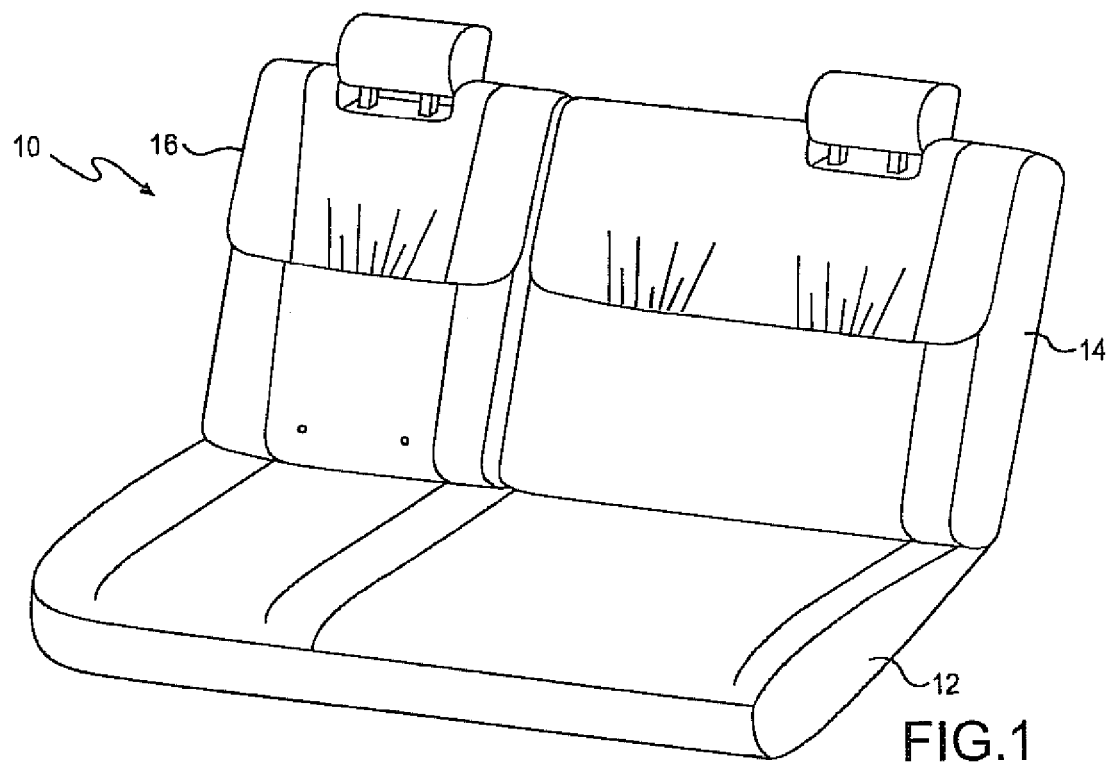
FIG. 1 is perspective view of a seat assembly according to one embodiment of the invention.
Figure 2:
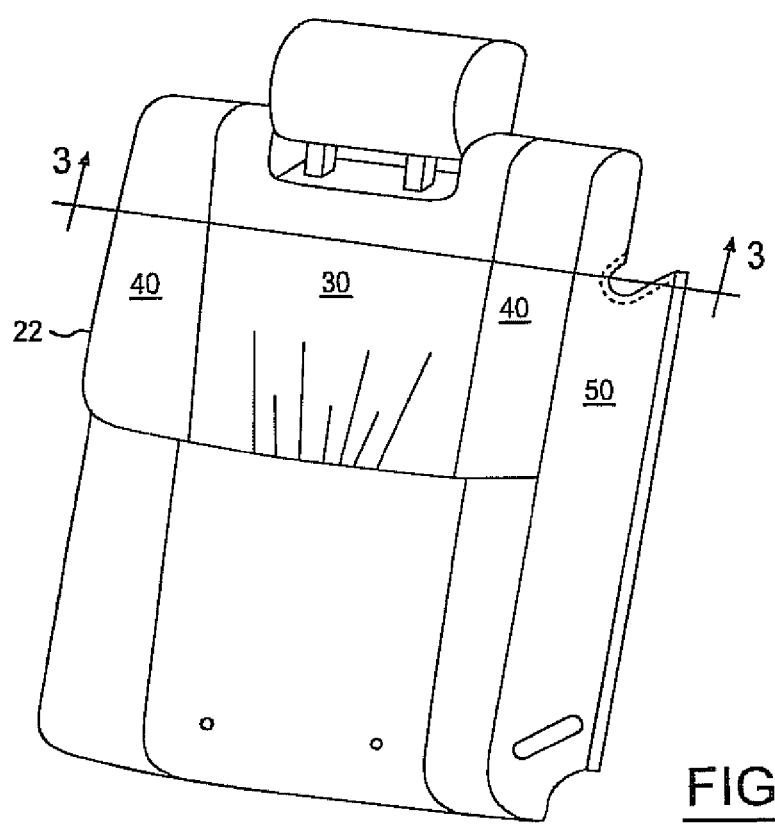
FIG. 2 is a perspective view of a trim cover according to one embodiment of the invention.

Referring to the figures, a seat assembly for a vehicle is generally indicated at 10. The seat assembly 10 includes a seat cushion 12. The seat assembly 10 also includes a seat back for supporting the torso of an occupant seated on the seat cushion 12. The seat back is split to define a first seat back 14 and second seat back 16. Each seat back 14, 16 includes a rigid frame, a foam pad and a trim cover. The foam pad is positioned along a front side of the frame. The trim cover covers and conceals both the foam pad and frame. Described in greater detail below, the trim cover according to one embodiment of the invention provides a flap that conceals the gap between the first 14 and second 16 seat backs.

Figure 3:
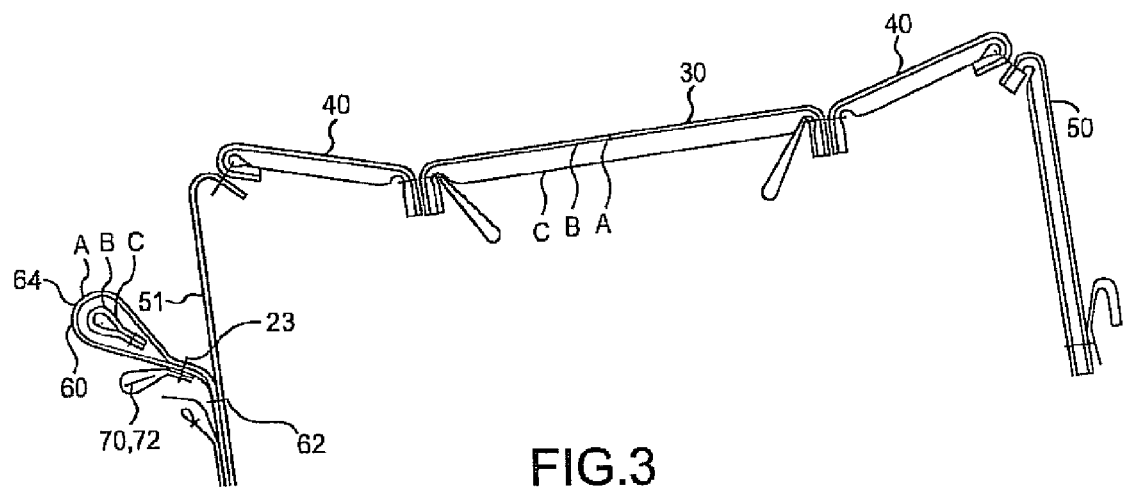
FIG. 3 is a cross sectional view of the trim cover as taken through the plane 3-3 indicated in FIG. 2.
Figure 4:
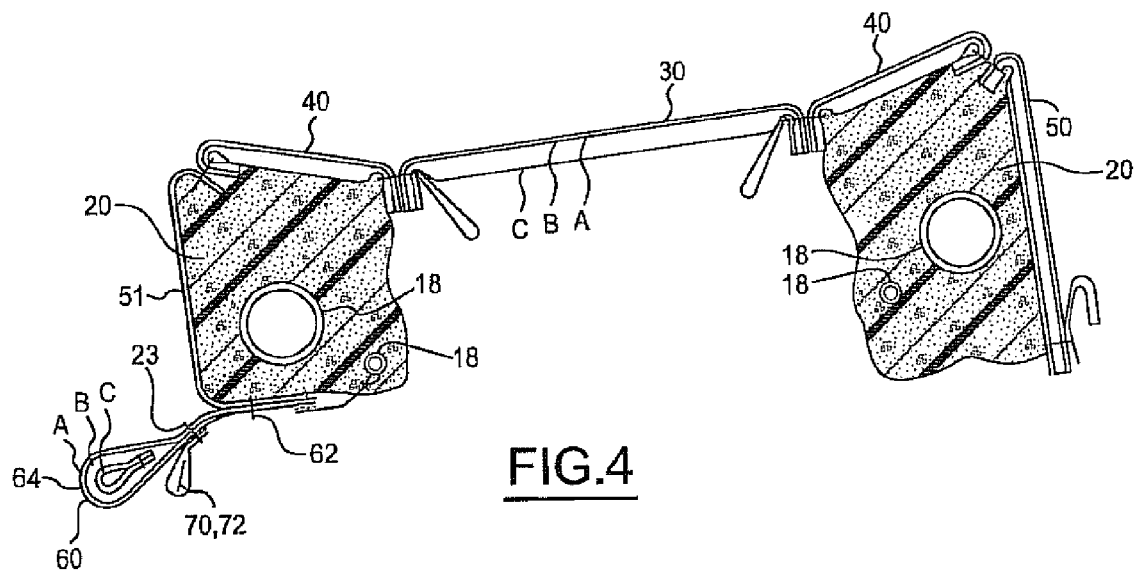
FIG. 4 is a cross-sectional view of the trim cover showing attachment to the seat back frame.

The trim cover 22 is formed by sewing a plurality of panels together along their edges. As best shown in FIG. 3, each panel includes a plurality of layers A, B, C. An outer layer A is made from textile, vinyl, leather or other similar materials known by those having ordinary skill in the art. A middle layer B is made from a thin layer of foam. An inner layer C is made from a conventional scrim material that facilitates assembly of the trim cover over the foam pad 20. The trim cover 22 includes a center panel 30 that covers most of a front surface of the foam pad 20 and, therefore, provides the main seating surface for the back of the occupant. The trim cover 22 also includes bolster panels 40 fixedly secured to each side of the center panel 30. The bolster panels 40 cover bolster sections of the foam pad 20, which support the sides of the occupants torso. The trim cover 22 further includes side panels 50, 51 fixedly secured to respective bolster panels 40. The side panels 50, 51 are fixedly secured to the seat back frame 18 by hog-rings, or other suitable fixing means known by those having ordinary skill in the art, such as J-strips.

The flap 60 is sewn to the inboard side panel 51 of the trim cover 22 at an inner portion 62. More specifically, the flap 60 is formed from a panel of the same material used to make the other panels 30, 40, 50 of the trim cover 22. The flap 60 is formed by sewing a seam 23 along one end of the panel to a middle portion of the panel, thereby creating a closed-section pocket or loop. The panel is folded so that the foam B and scrim C layers of the loop are concealed within the outer layer A of the loop to form a flap having an outer free end 64.

Figure 5:
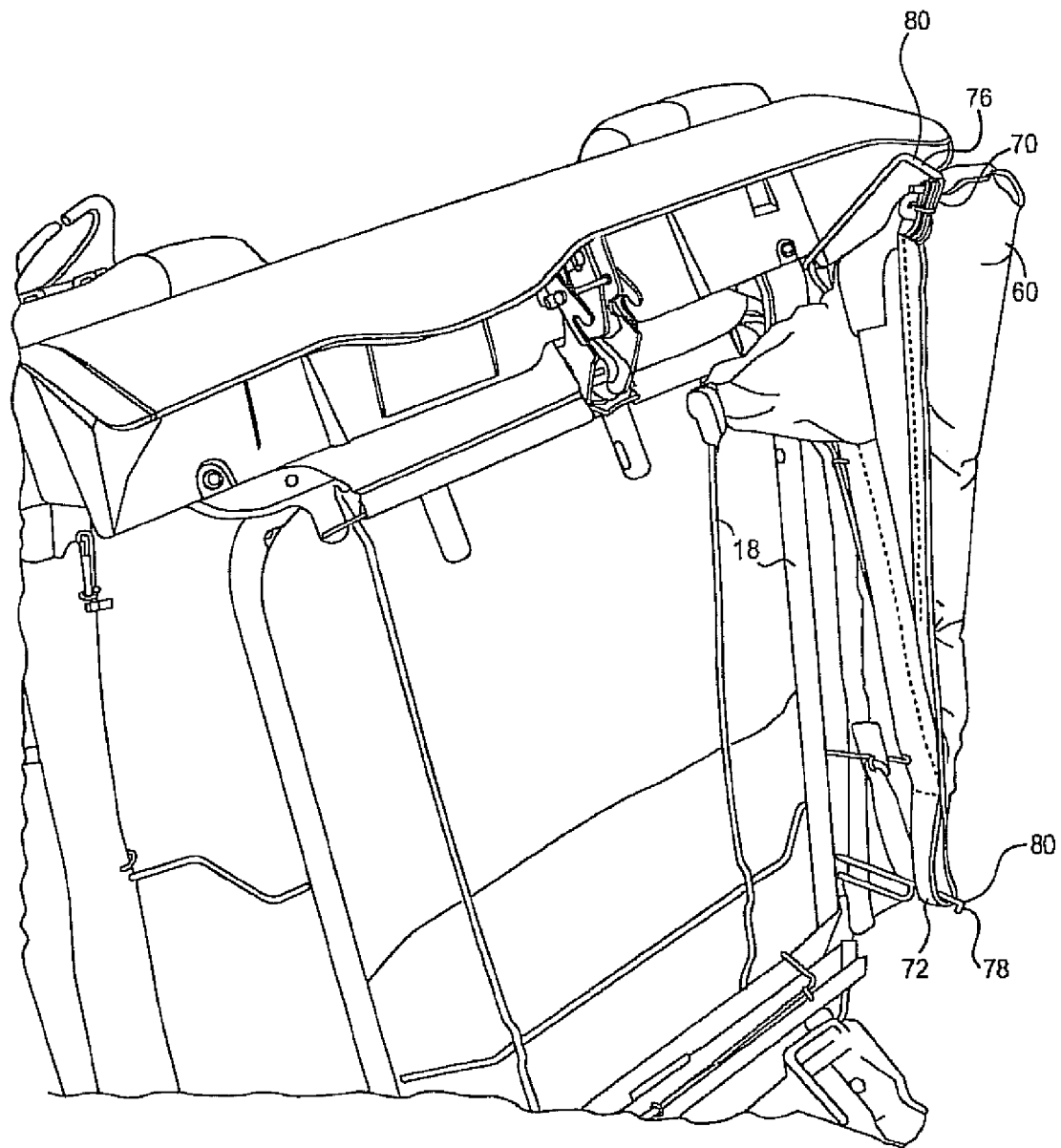
FIG. 5 is a rear perspective view of the seat back frame assembly.

As best shown in FIG. 5, elastic loops 70, 72 extend from opposite ends of the flap 60. The flap 60 is maintained generally taut by securing the elastic loops 70, 72 to respective spaced apart arms 76, 78 of the seat back frame 18. In one embodiment, the loops 70 72 are formed at opposite ends of a single length of elastic strip or band. Alternatively, individual loops 70, 72 of elastic are sewn to opposite upper and lower ends of the flap 60. Each arm 76, 78 is attached to the seat back frame and extends to a distal end 80. Each arm extends outward from the seat back frame 18 to its respective distal end 80 so that the flap 60 is held in an outwardly extending position for concealing the gap between the seat backs 14, 16. The loops 70, 72 are flexible for maintaining the flap 60 in the inwardly extending position, while at the same time accomodating interference between the flap 60 and obstacles in the vehicle, such as an adjacent seat back, during angular adjustment of the seat back.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A trim cover for covering a seat back assembly of an automotive vehicle, the seat back assembly pivotable about a horizontal axis with respect to an adjacent structure, the trim cover comprising:

a center panel having spaced apart ends;

a pair of side panels fixedly secured to respective ends of the center panel;

a flap having a top, a bottom, and an inner portion extending to an unattached end, wherein the inner portion, and the top and the bottom of the flap are fixedly secured to one of the side panels; and an elastic member attached to the inner portion of the flap, and extending between the top and the bottom of the flap, the elastic member continuously biasing the flap such that the unattached end extends outwardly from the one of the side panels towards the adjacent structure to conceal a gap between the seat back assembly and the adjacent structure during selective pivotal adjustment of the seat back assembly relative to the adjacent structure.

2. A trim cover as set forth in claim 1, wherein the flap includes an outer layer surrounding an inner foam layer.

3. A trim cover as set forth in claim 1, wherein the elastic member includes loops sewn at opposite ends thereof for attaching the elastic member to a frame of the seat back assembly.

4. A seat back assembly in an automotive vehicle, the seat back assembly movable with respect to an adjacent structure, comprising:

a frame having spaced apart upper and lower arms, the upper and lower arm extending outwardly from the frame to a distal end; and a trim cover having a center panel with spaced apart ends;

a pair of side panels fixedly secured to respective ends of the center panel;

a flap having a top, a bottom, and an inner portion extending to an unattached end, wherein the inner portion, and the top and the bottom of the flap are fixedly secured to one of the side panels; and an elastic member attached to the inner portion of the flap and extending between the top and the bottom of the flap, the elastic member securing the flap to the upper and lower arms of the frame for continuously biasing the flap such that the unattached free end extends outwardly from the inner portion to conceal a gap between the seat back assembly and the adjacent structure in a vehicle during selective pivotal adjustment of the seat back assembly relative to the vehicle.

5. A seat back assembly as set forth in claim 4, wherein the elastic member includes loops sewn at opposite ends of the flap for attaching the flap to the upper and lower arms of the frame.

6. A seat back assembly as set forth in claim 5, wherein one of the loops being fitted over the distal end of the upper arm and the other of the loops being fitted over the distal end of the lower arm, the upper and lower arm working in concert to tension the elastic member vertically along the side panel.

7. A seat back assembly as set forth in claim 4, wherein the frame includes a tubular main frame having opposite and spaced apart upper and lower ends.

8. A seat back assembly as set forth in claim 7, wherein the upper and lower arms extend outwardly from the respective upper and lower ends of the main frame.

9. A seat back assembly as set forth in claim 4, wherein the flap includes an outer layer surrounding an inner foam layer.

* * * * *

UNITED STATES PATENT AND TRADEMARK OFFICE
CERTIFICATE OF CORRECTION

| | |
|---|---|
| PATENT NO. | : 7,469,968 B2 |
| APPLICATION NO. | : 11/337415 |
| DATED | : December 30, 2008 |
| INVENTOR(S) | : Robert Joseph Hazlewood |

It is certified that error appears in the above-identified patent and that said Letters Patent is hereby corrected as shown below:

Column 2, line 47, replace "outward" with --outwardly--

Column 2, line 52, replace "accomodating" with --accommodating--

Signed and Sealed this

Twenty-fourth Day of March, 2009

JOHN DOLL
*Acting Director of the United States Patent and Trademark Office*